(12) United States Patent
Yanagisawa

(10) Patent No.: US 10,878,982 B2
(45) Date of Patent: Dec. 29, 2020

(54) COIL UNIT, DRIVE MECHANISM, WINDING DEVICE AND WINDING METHOD

(71) Applicant: NIDEC SANKYO CORPORATION, Suwa-gun, Nagano (JP)

(72) Inventor: Kazuhiko Yanagisawa, Suwa-gun Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 397 days.

(21) Appl. No.: 15/988,525

(22) Filed: May 24, 2018

(65) Prior Publication Data

US 2018/0268973 A1  Sep. 20, 2018

Related U.S. Application Data

(62) Division of application No. 14/724,222, filed on May 28, 2015, now Pat. No. 10,304,605.

(51) Int. Cl.
*H01F 5/02* (2006.01)
*H01F 41/064* (2016.01)
(Continued)

(52) U.S. Cl.
CPC .............. *H01F 5/02* (2013.01); *H01F 41/064* (2016.01); *H01F 41/096* (2016.01);
(Continued)

(58) Field of Classification Search
CPC ......... H01F 2005/022; H01F 2005/027; H01F 2005/043; H01F 41/064; H01F 41/069;
(Continued)

(56) References Cited

U.S. PATENT DOCUMENTS 2,306,855 A * 12/1942 Allen ...................... H02K 15/09
310/206
4,408,726 A * 10/1983 Leonov ................. H01F 41/086
140/92.1
(Continued)

FOREIGN PATENT DOCUMENTS

JP          03079005 A      4/1991
JP       2011081288 A       4/2011

OTHER PUBLICATIONS

USPTO Notice of Allowance corresponding to U.S. Appl. No. 14/724,222; dated Jan. 25, 2019.
(Continued)

*Primary Examiner* — Emmanuel M Marcelo
(74) *Attorney, Agent, or Firm* — Cantor Colburn LLP

(57) ABSTRACT

A coil unit may include an even number of coils comprising a first coil and a second coil; and a coil holding member which holds the even number of the coils. An outer peripheral face of the coil holding member may include a side-face pair comprising a first side face and a second side face which are substantially parallel to each other. The first side face may be formed with a first protruded part around which the first coil is wound, the first protruded part being protruded to an outer peripheral side with respect to the coil holding member. The second side face may be formed with a second protruded part around which the second coil is wound, the second protruded part being protruded to an outer peripheral side with respect to the coil holding member. The first coil and the second coil may be structured from one conducting wire.

13 Claims, 10 Drawing Sheets

(51) Int. Cl.
*H01F 41/096* (2016.01)
*H01F 41/098* (2016.01)
*H04N 5/225* (2006.01)
*H04N 5/232* (2006.01)

(52) U.S. Cl.
CPC ......... *H01F 41/098* (2016.01); *H04N 5/2253* (2013.01); *H04N 5/2254* (2013.01); *H04N 5/2257* (2013.01); *H04N 5/23258* (2013.01); *H04N 5/23287* (2013.01); *H01F 2005/027* (2013.01); *Y10T 29/49073* (2015.01)

(58) Field of Classification Search
CPC .... H01F 41/071; H01F 41/086; H01F 41/088; H01F 41/098; Y10T 29/48073
USPC ............................... 242/433.4, 437.3, 445.1
See application file for complete search history.

(56) References Cited

U.S. PATENT DOCUMENTS

| | | | | |
|---|---|---|---|---|
| 4,765,551 A | * | 8/1988 | Page | H02K 15/09 |
| | | | | 242/433.4 |
| 4,779,812 A | * | 10/1988 | Fisher | H01F 27/322 |
| | | | | 242/434.7 |
| 5,915,643 A | * | 6/1999 | Dolgas | H02K 3/28 |
| | | | | 242/433 |
| 7,267,296 B2 | * | 9/2007 | Ponzio | H02K 15/0056 |
| | | | | 242/433 |
| 2003/0007799 A1 | | 1/2003 | Aoshima | |
| 2005/0206264 A1 | * | 9/2005 | Yamamoto | H02K 13/04 |
| | | | | 310/216.001 |
| 2008/0290979 A1 | * | 11/2008 | Suzuki | H01F 41/076 |
| | | | | 336/192 |
| 2009/0134736 A1 | * | 5/2009 | Yamamoto | H02K 23/28 |
| | | | | 310/203 |
| 2011/0096178 A1 | | 4/2011 | Ryu et al. | |
| 2012/0286619 A1 | * | 11/2012 | Tsuiki | H02K 3/522 |
| | | | | 310/215 |
| 2013/0170040 A1 | | 7/2013 | Yu | |
| 2014/0001976 A1 | * | 1/2014 | Park | H01F 5/04 |
| | | | | 315/276 |

OTHER PUBLICATIONS

USPTO Non-Final Office Action corresponding to U.S. Appl. No. 14/724,222; dated Jul. 26, 2018.

\* cited by examiner

Fig. 1
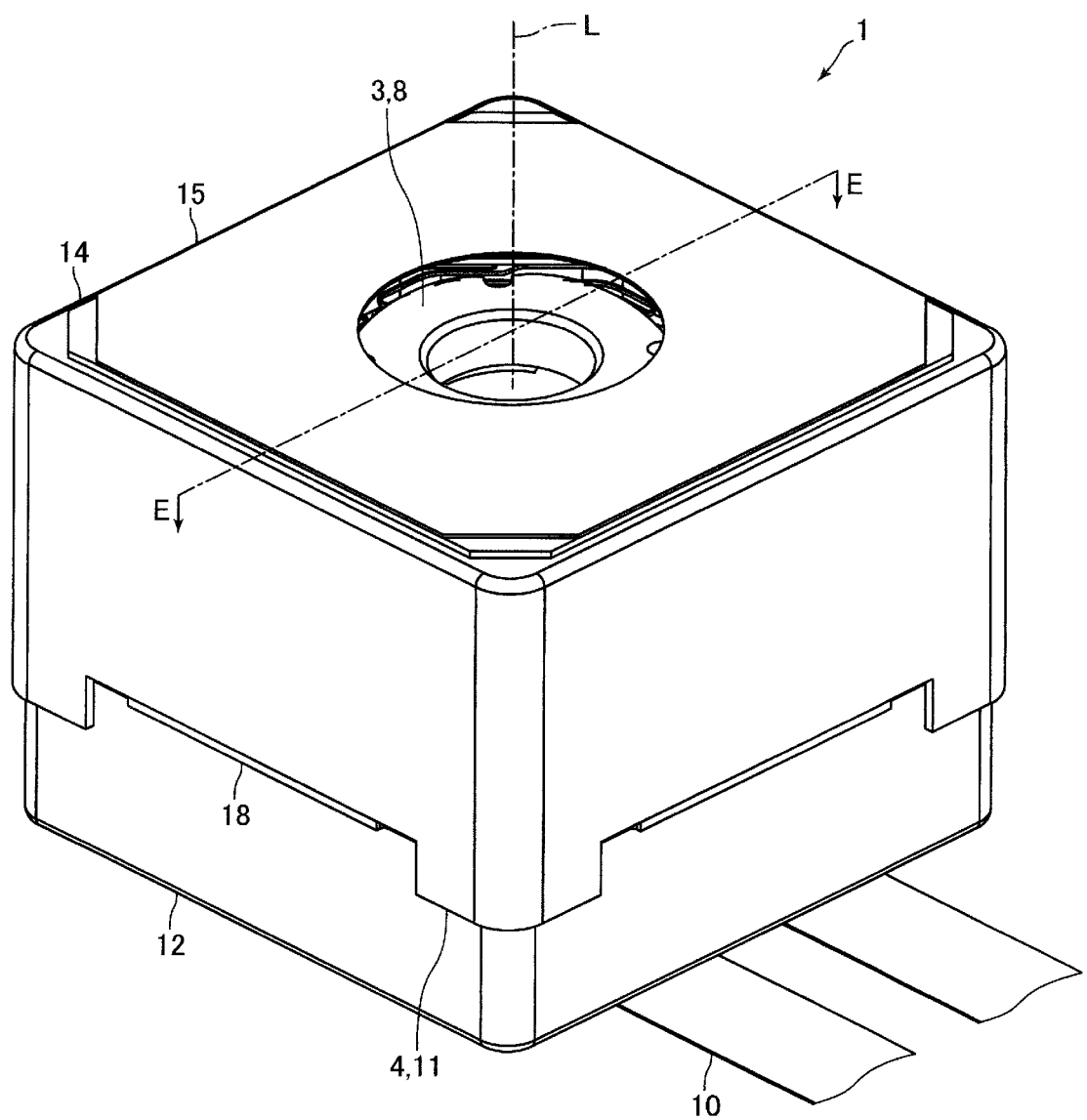
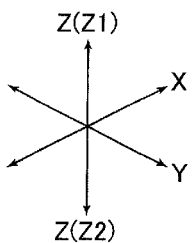

Fig. 4
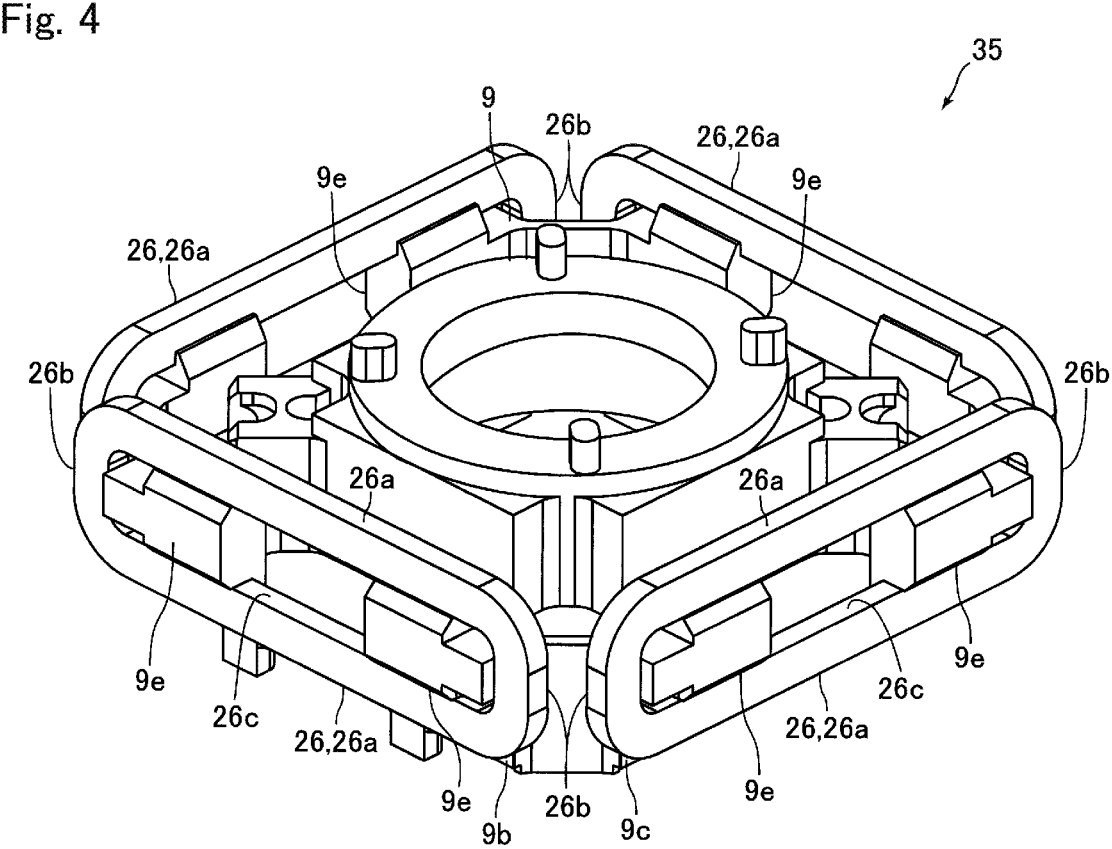
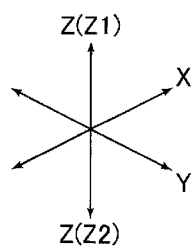

Fig. 8
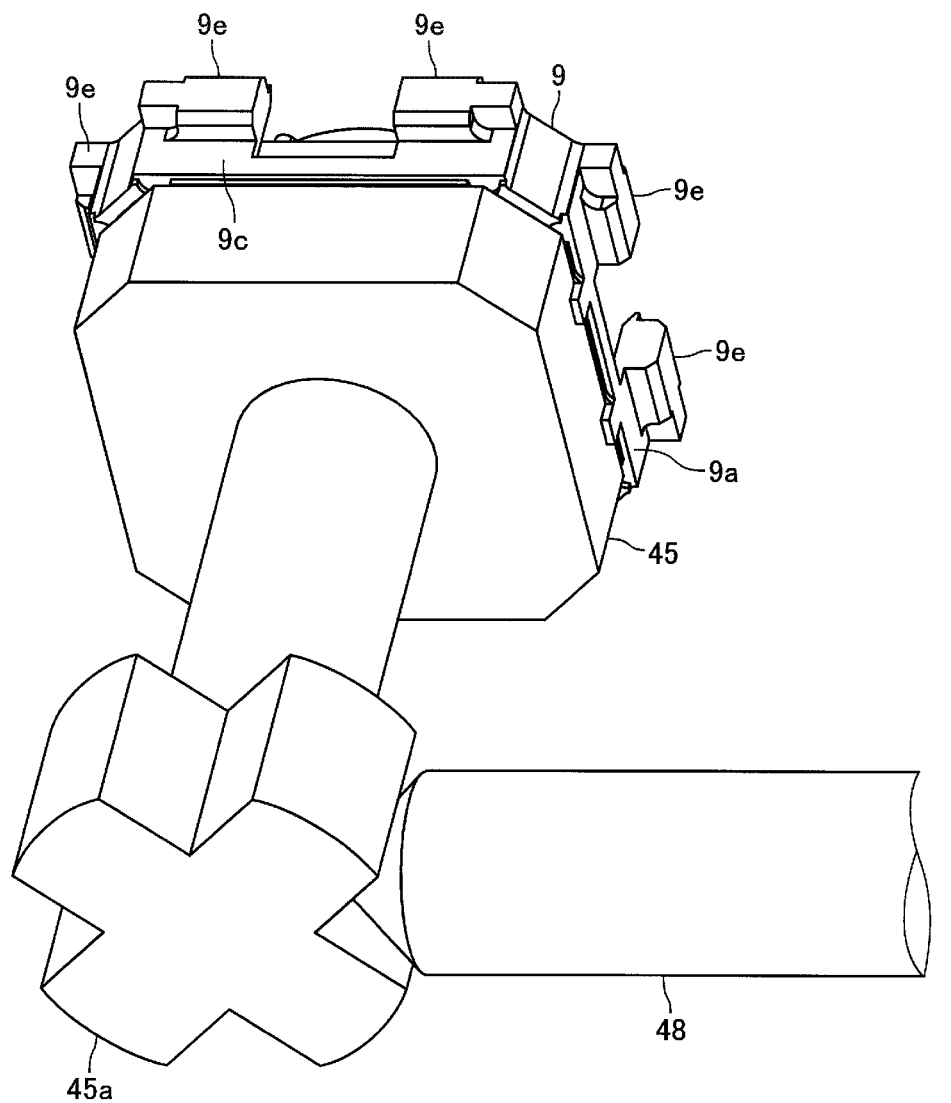
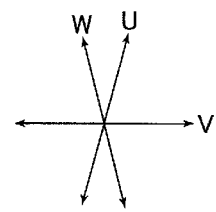

COIL UNIT, DRIVE MECHANISM, WINDING DEVICE AND WINDING METHOD

CROSS REFERENCE TO RELATED APPLICATION

The present application is a divisional application of U.S. patent application Ser. No. 14/724,222, filed on May 28, 2015, the entire contents of which are incorporated herein by reference. The Ser. No. 14/724,222 application claimed the benefit of the date of the earlier filed Japanese Patent Application No. 2014-109735, filed May 28, 2014, priority to which is also claimed herein, and the contents of which are also incorporated by reference herein.

FIELD OF THE INVENTION

At least an embodiment of the present invention may relate to a coil unit including a plurality of coils and a coil holding member holding a plurality of the coils, and to a drive mechanism including the coil unit. Further, at least an embodiment of the present invention may relate to a winding device for winding a coil on a coil holding member, and to a winding method in which a coil is wound on a coil holding member by using the winding device.

BACKGROUND

A photographing optical device has been conventionally known which is provided with a shake correction function for correcting a shake such as a hand shake (see, for example, Japanese Patent Laid-Open No. 2011-81288). The photographing optical device described in the Patent Literature includes a movable module having a lens and an imaging element, a support body which swingably supports the movable module, a plate spring which connects the movable module with the support body, and a swing drive mechanism structured to swing the movable module with respect to the support body for correcting a shake. The swing drive mechanism includes four drive magnets and four drive coils respectively disposed oppositely to the four drive magnets. The drive magnets are fixed to an outer peripheral face of the movable module which is formed in a substantially quadrangular prism shape. The drive coil is an air-core coil. The support body includes a case body formed in a substantially rectangular tube shape and the drive coils are fixed to an inner peripheral face of the case body.

Further, a winding device for winding an air-core coil has been conventionally known (see, for example, Japanese Patent Laid-Open No. Hei 3-79005). In the winding device described in this Patent Literature, a winding wire material is wound around a winding core which is disposed between a side frame and an opposed side frame face and then the winding core is rotated. In this manner, an air-core coil whose side faces are formed by the side frame and the opposed side frame face is manufactured.

In the photographing optical device described in the former Patent Literature, each of four drive coils which are air-core coils are required to be fixed to an inner peripheral face of the case body which is formed in a substantially rectangular tube shape and thus attaching work of the drive coils to the case body is complicated. Further, in this photographing optical device, respective both end parts of each of four drive coils (in other words, both end parts of a conducting wire structuring the drive coil) are required to be connected and processed. In other words, in the photographing optical device, eight end parts of conducting wires are required to be connected and processed. Therefore, in the photographing optical device, attaching work of drive coils to the case body is further complicated.

SUMMARY

In view of the problem described above, at least an embodiment of the present invention may advantageously provide a coil unit including a coil and a coil holding member which holds the coil, wherein attaching work of the coil to the coil holding member can be easily performed. Further, at least an embodiment of the present invention may advantageously provide a drive mechanism including the coil unit.

Further, the present inventor has considered and examined to directly wind a coil on a coil holding member structured to hold the coil. In the above-mentioned latter Patent Literature, a winding device for manufacturing an air-core coil is disclosed but a winding device by which a coil is directly wound on a coil holding member is not disclosed.

In view of the problem described above, at least another embodiment of the present invention may advantageously provide a winding device which is capable of preventing winding collapse of a coil even when the coil is directly wound on a coil holding member structured to hold the coil. Further, at least another embodiment of the present invention may advantageously provide a winding method for winding a coil on a coil holding member by using the winding device.

According to at least an embodiment of the present invention, there may be provided a coil unit including an even number of coils and a coil holding member which holds the even number of the coils. An outer peripheral face of the coil holding member is formed with a side-face pair comprised of a pair of side faces which are substantially parallel to each other, and the outer peripheral face of the coil holding member is structured of two or more side-face pairs. The side face is formed with a protruded part around which the coil is directly wound and the protruded part is protruded to an outer peripheral side of the coil holding member, and the two coils which are wound around the protruded parts on the side-face pair are structured of one conducting wire.

In the coil unit in accordance with at least an embodiment of the present invention, a coil is directly wound around a protruded part formed on a side face of a coil holding member. Therefore, according to at least an embodiment of the present invention, a coil is attached to a coil holding member by winding a coil (conducting wire) around the protruded part. Further, in at least an embodiment of the present invention, two coils which are wound around the protruded parts on the side-face pair comprised of a pair of side faces are structured of one conducting wire. Therefore, the number of end parts of a conducting wire required to be processed can be reduced. Accordingly, in at least an embodiment of the present invention, attaching work of the coil to the coil holding member can be performed easily.

In at least an embodiment of the present invention, an inner face of the coil is directly contacted with the protruded part. According to this structure, a fixed strength of the coil to the coil holding member can be increased.

In at least an embodiment of the present invention, a tip end side of the protruded part is protruded to an outer peripheral side with respect to the coil holding member relative to the coil. According to this structure, winding collapse of the coil which is wound around the protruded part is hard to be occurred. Further, according to this structure, the coil is hard to contact with an external member when the coil unit is handled. Therefore, damage of the coil when the coil unit is handled can be prevented from being occurred.

In at least an embodiment of the present invention, the coil holding member is formed in a tube shape, the coil is formed in a substantially rectangular frame shape which is structured of two long side parts and two short side parts shorter than the long side part, the coil is wound around the protruded part so that an axial direction of the coil holding member formed in the tube shape and a short widthwise direction of the coil are coincided with each other and that a direction perpendicular to the axial direction and a longitudinal direction of the coil are coincided with each other and, when a portion of the long side part of an inner face of the coil which is formed in the substantially rectangular frame shape is referred to as a first inner face and a portion of the short side part of the inner face of the coil is referred to as a second inner face, the side face is formed with the protruded part so as to contact with at least parts of the two first inner faces and at least parts of the two second inner faces. According to this structure, the coil which is directly wound around the protruded part to be formed in a substantially rectangular frame shape can be formed with a high degree of accuracy, and accuracy of an attaching position of the coil with respect to the coil holding member can be enhanced. In this case, it is preferable that the protruded part is formed to be divided into two portions so that a head side protruded part is capable of being entered therebetween, the head side protruded part being provided in a subordinate head which functions as a guide for winding when the conducting wire is to be wound around the protruded part. According to this structure, the positional relationship between the subordinate head and the coil holding member can be determined through the head side protruded part with a high degree of accuracy.

In at least an embodiment of the present invention, the coil holding member is formed in a tube shape, the coil is formed in a substantially rectangular frame shape which is structured of two long side parts and two short side parts shorter than the long side part, the coil is wound around the protruded part so that an axial direction of the coil holding member formed in the tube shape and a short widthwise direction of the coil are coincided with each other and that a direction perpendicular to the axial direction and a longitudinal direction of the coil are coincided with each other and, when a portion of the long side part of an inner face of the coil which is formed in the substantially rectangular frame shape is referred to as a first inner face, the side face is formed with one protruded part with which center portions of the two first inner faces are contacted. In this case, accuracy of an attaching position of the coil to the coil holding member can be enhanced in an axial direction of the coil holding member. Further, in this case, it may be structured that spaces are formed on both sides of the one protruded part between the one protruded part and the two short side parts of the coil and the spaces are formed by head side protruded parts provided in a subordinate head for determining positions of the short side parts when the coil is to be wound around the one protruded part.

The coil unit in accordance with at least an embodiment of the present invention may be, for example, used in a drive mechanism which includes drive magnets oppositely disposed to the coils. In the drive mechanism, for example, the coil holding member is formed in a tube shape and an outer peripheral face of the coil holding member is structured of two side-face pairs, and the outer peripheral face of the coil holding member when viewed in an axial direction of the coil holding member formed in the tube shape is formed in a substantially square shape or a substantially rectangular shape. According to the drive mechanism, attaching work of the coil to the coil holding member can be performed easily.

According to at least an embodiment of the present invention, there may be provided a winding device including a main body part which is rotatable and to which a coil holding member structured to hold a coil is fixed, a supply nozzle from which a conducting wire for structuring the coil is supplied, and a subordinate head which is rotatable together with the main body part. A side face of the coil holding member is formed with a protruded part which is protruded to an outer peripheral side with respect to the coil holding member and around which the coil is to be directly wound, and the subordinate head is disposed so as to face the side face of the coil holding member. When the subordinate head and the main body part are rotated together in a state that the protruded part is interposed between the subordinate head and the side face of the coil holding member, the conducting wire is wound around the protruded part to structure the coil.

The winding device in at least an embodiment of the present invention includes a main body part which is rotatable and to which a coil holding member structured to hold a coil is fixed, and a subordinate head which is disposed so as to face a side face of the coil holding member and is rotatable together with the main body part. Therefore, according to at least an embodiment of the present invention, even when the coil is directly wound around the protruded part of the coil holding member having no winding collapse prevention part such as a flange part for preventing winding collapse of the coil to an outer peripheral side of the coil holding member, winding collapse of the coil is prevented by the subordinate head.

In at least an embodiment of the present invention, the subordinate head is formed with a recessed part into which a tip end side portion of the protruded part is entered. According to this structure, even when variations in manufacture of structural components of the winding device and the coil holding member are occurred, or even when there are assembling errors of the winding device and attaching errors of the coil holding member to the main body part, a gap space is not formed between the tip end of the protruded part and the subordinate head. Therefore, winding collapse of the coil which is directly wound around the protruded part having no winding collapse prevention part can be prevented surely.

In at least an embodiment of the present invention, the coil holding member is formed in a tube shape, the coil is formed in a substantially rectangular frame shape which is structured of two long side parts and two short side parts shorter than the long side part, the coil is wound around the protruded part so that an axial direction of the coil holding member formed in the tube shape and a short widthwise direction of the coil are coincided with each other and that a direction perpendicular to the axial direction and a longitudinal direction of the coil are coincided with each other and, when a portion of the long side part of an inner face of the coil which is formed in the substantially rectangular frame shape is referred to as a first inner face and a portion of the short side part of the inner face of the coil is referred to as a second inner face, the side face is formed with two protruded parts so as to contact with at least parts of the two first inner faces and at least a part of the two second inner faces, and the subordinate head is formed with a head side protruded part which is protruded to a coil holding member side and disposed between the two protruded parts. According to this structure, when the coil is to be wound around the protruded part, the coil holding member is easily positioned to the subordinate head.

In at least an embodiment of the present invention, the coil holding member is formed in a tube shape, the coil is formed in a substantially rectangular frame shape which is structured of two long side parts and two short side parts shorter than the long side part, the coil is wound around the protruded part so that an axial direction of the coil holding member formed in the tube shape and a short widthwise direction of the coil are coincided with each other and that a direction perpendicular to the axial direction and a longitudinal direction of the coil are coincided with each other and, when a portion of the long side part of an inner face of the coil which is formed in the substantially rectangular frame shape is referred to as a first inner face, the side face is formed with one protruded part with which center portions of the two first inner faces are contacted, the subordinate head is formed with two head side protruded parts which are disposed on both sides of the one protruded part in the longitudinal direction of the coil and are protruded to a coil holding member side, a width of the one protruded part in the axial direction is set to be wider than a width of the head side protruded part in the axial direction, and a thickness of the one protruded part in a thickness direction of the coil which is perpendicular to the axial direction is set to be not more than a thickness of the head side protruded part in the thickness direction of the coil.

According to this structure, a width of the one protruded part in the axial direction is set to be wider than a width of the head side protruded part in the axial direction. Therefore, even in a case that the one protruded part with which only center portions of two first inner faces are contacted is formed on the side face of the coil holding member, the coil can be directly wound around the protruded part. Further, according to this structure, a thickness of the one protruded part in a thickness direction of the coil is set to be not more than a thickness of the head side protruded part in a thickness direction of the coil and thus, even when variations in manufacture of structural components of the winding device and the coil holding member are occurred or, even when there are assembling errors of the winding device and attaching errors of the coil holding member to the main body part, a gap space is not formed between the tip end of the head side protruded part and the side face of the coil holding member. Therefore, even in a case that the one protruded part with which only center portions of two first inner faces are contacted is formed on the side face of the coil holding member, winding collapse of the coil which is directly wound around the one protruded part having no winding collapse prevention part can be prevented surely. In addition, according to this structure, the tip end side of the one protruded part is not protruded to an outer peripheral side with respect to the coil holding member relative to the coil and thus, while securing a thickness of the coil, the size of the coil unit structured of the coil holding member and the coil can be reduced.

In at least an embodiment of the present invention, an outer peripheral face of the coil holding member is formed with a plurality of side-face pairs comprised of a pair of side faces which are substantially parallel to each other, the protruded part is formed on each of the side faces of the plurality of the side-face pairs, the subordinate head is formed with an opposed face which faces the side face of the coil holding member on which the conducting wire is to be wound, and the subordinate head is movable so as to be close to and separated from the side face on which the conducting wire is to be wound, the coil holding member is turnably attached to the main body part so that the side face of the coil holding member facing the opposed face of the subordinate head can be changed, and the subordinate head and the main body part are rotated together in a state that the opposed face of the subordinate head is close to the side face on which the conducting wire is to be wound and thereby the conducting wire is wound around the protruded part of the coil holding member to structure the coil. Specifically, it may be structured that the main body part includes a mounting part on which the coil holding member is mounted and a base part which turnably holds the mounting part, the mounting part is turnable with a direction perpendicular to an axial direction of rotation of the main body part as an axial direction, the subordinate head is movable in the axial direction of rotation of the main body part, the conducting wire is wound around the protruded part of the coil holding member to structure the coil and, after that, the subordinate head is separated from the coil holding member and the mounted part is turned so that the side face of the coil holding member facing the opposed face of the subordinate head is changed and then, the subordinate head is set to be close to the coil holding member again and the conducting wire is wound around the protruded part of the side face having been changed to structure the coil.

In at least an embodiment of the present invention, a coil may be directly wound around the protruded part of the coil holding member by using the winding device. When a conducting wire is wound around by using this winding method, even when a coil is directly wound around a protruded part having no winding collapse prevention part, winding collapse of the coil is prevented by operation of the subordinate head.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a perspective view showing a photographing optical device on which a coil unit in accordance with an embodiment of the present invention is mounted.

FIG. 4 is a perspective view showing a coil unit in accordance with an embodiment of the present invention.

FIG. 8 is a perspective view showing a part of a holder mounting part and a lock part shown in FIG. 6.

FIG. 10(A) is its side view and FIG. 10(B) is its plan view.

DETAILED DESCRIPTION OF THE PREFERRED EMBODIMENTS

Embodiments of the present invention will be described below with reference to the accompanying drawings.

(Entire Structure of Photographing Optical Device)

Figure 2:
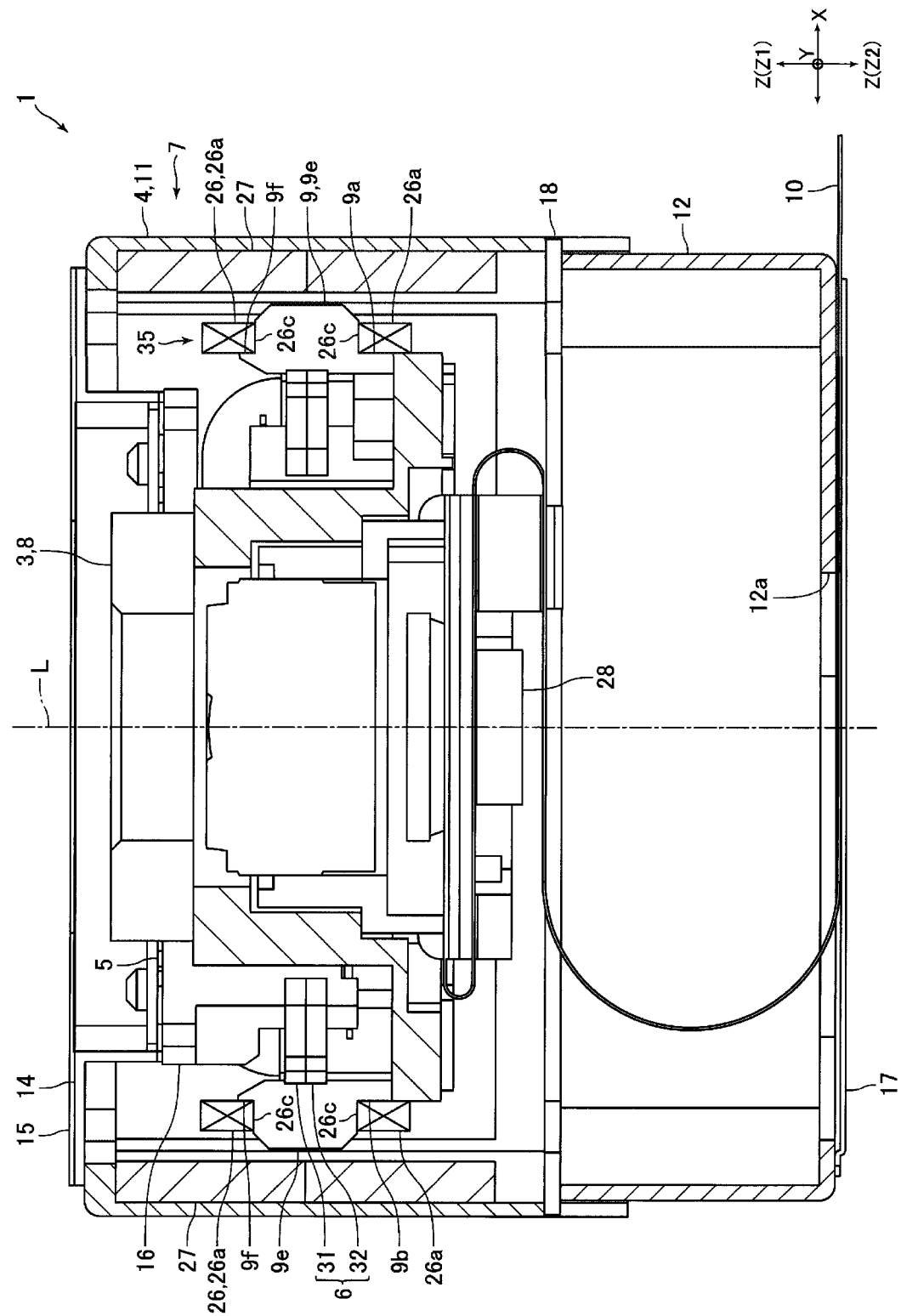
FIG. 2 is a cross-sectional view showing the "E-E" cross section in FIG. 1.
Figure 3:
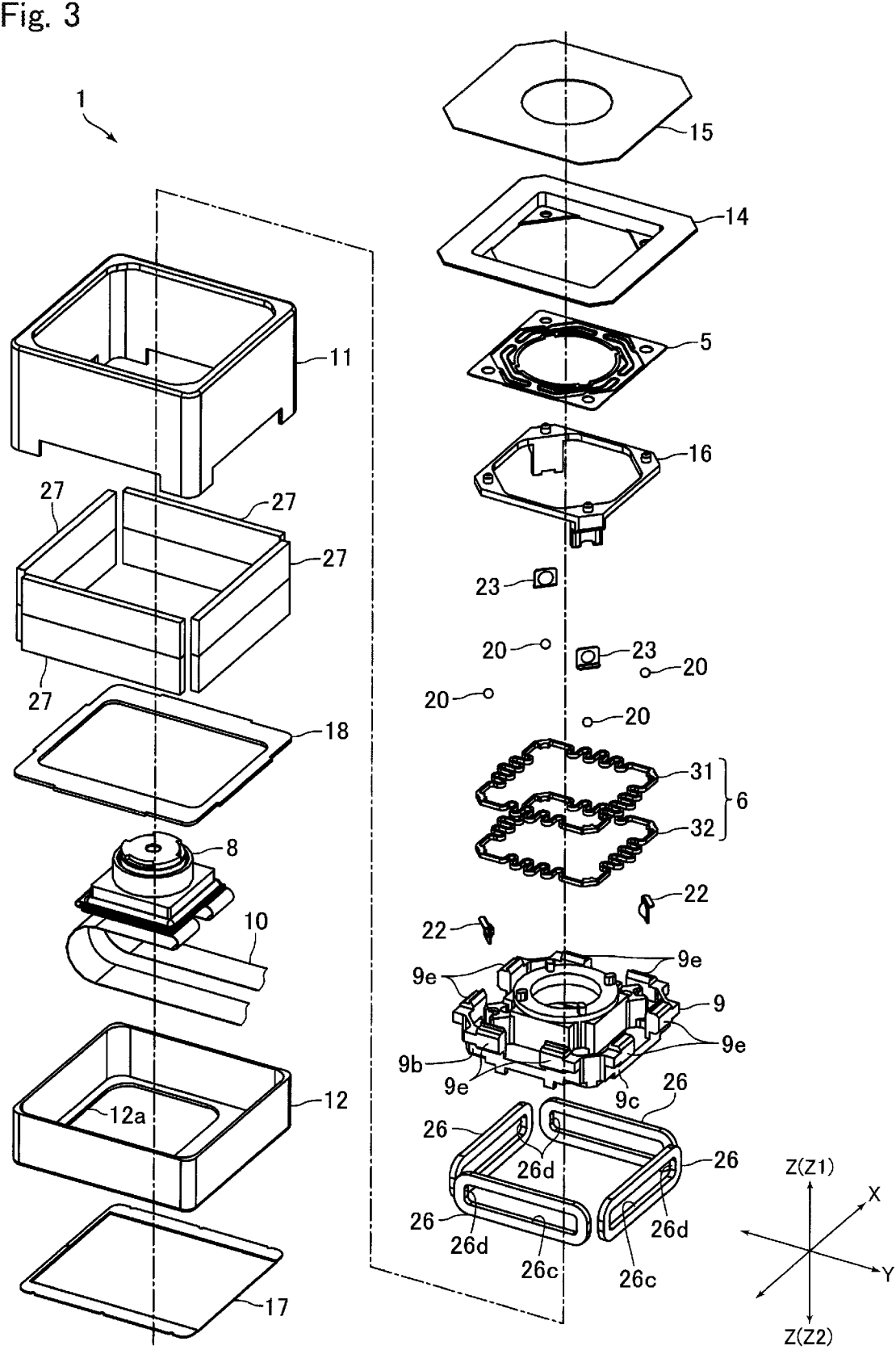
FIG. 3 is an exploded perspective view showing the photographing optical device in FIG. 1.

FIG. 1 is a perspective view showing a photographing optical device 1 on which a coil unit 35 in accordance with an embodiment of the present invention is mounted. FIG. 2 is a cross-sectional view showing the "E-E" cross section in FIG. 1. FIG. 3 is an exploded perspective view showing the photographing optical device 1 in FIG. 1. In the following descriptions, as shown in FIG. 1 and the like, respective three directions perpendicular to each other are set to be an "X" direction, a "Y" direction and a "Z" direction, and the "X" direction is set to be a right and left direction, the "Y" direction is set to be a front and rear direction, and the "Z" direction is set to be an upper and lower direction. Further, a "Z1" direction side in FIG. 1 is an "upper" side and a "Z2" direction side is a "lower" side.

A photographing optical device 1 in this embodiment is a small and thin camera which is mounted on a portable apparatus such as a cell phone, a drive recorder, a monitor camera system or the like and is provided with a shake correction function for correcting a shake such as a hand shake. The photographing optical device 1 is formed in a substantially quadrangular prism shape as a whole. In this embodiment, the photographing optical device 1 is formed in a substantially square shape when viewed in a direction of an optical axis "L" (optical axis direction) of a lens for photographing and four side faces of the photographing optical device 1 are substantially parallel to planes formed of the right and left direction and the upper and lower direction, or planes formed of the front and rear direction and the upper and lower direction.

The photographing optical device 1 includes a movable module 3 on which a lens for photographing and an imaging element are mounted and a support body 4 which swingably holds the movable module 3. The movable module 3 is connected with the support body 4 through spring members 5 and 6. Further, the photographing optical device 1 is provided with a shake correction mechanism 7 by which the movable module 3 is swung with respect to the support body 4 to correct a shake such as a hand shake. In this embodiment, the upper and lower direction is substantially coincided with an optical axis direction of the movable module 3 when the movable module 3 is not swung. Further, in this embodiment, an imaging element is mounted on a lower end of the movable module 3 so that an object to be photographed which is disposed on an upper side is photographed.

The movable module 3 is formed in a substantially quadrangular prism shape whose shape when viewed in the optical axis direction is a substantially square shape as a whole. The movable module 3 includes a camera module 8 having a lens and an imaging element, and a holder 9 to which the camera module 8 is fixed. The camera module 8 includes, for example, a movable body which holds the lens and is movable in its optical axis direction, a holding body which holds the movable body movably in the optical axis direction, a plate spring which connects the movable body with the holding body, and a drive mechanism structured to drive the movable body in the optical axis direction. In other words, the camera module 8 is provided with an autofocus mechanism. A flexible printed circuit board 10 is extended out from a lower end side of the camera module 8. In accordance with an embodiment of the present invention, the camera module 8 may be provided with no autofocus mechanism.

The holder 9 is formed in a tube shape whose outward shape when viewed in the optical axis direction is a substantially square shape. The camera module 8 is fixed to an inner peripheral side of the holder 9 so that an outer peripheral side of the camera module 8 is covered by the holder 9. An axial direction of the holder 9 formed in a tube shape is coincided with the optical axis direction. The holder 9 in this embodiment is a coil holding member which holds an even number of shake correction coils 26 described below which structure the shake correction mechanism 7.

The support body 4 includes a case body 11, which structures four side faces of the support body 4 in the front and rear direction and in the right and left direction, and a lower case body 12 which structures a lower end side portion of the support body 4. In this embodiment, the case body 11 structures four side faces of the photographing optical device 1 in the front and rear direction and in the right and left direction, and the lower case body 12 structures a lower end side portion of the photographing optical device 1. The case body 11 is formed in a substantially rectangular tube shape. A cover 14 formed in a substantially quadrangular frame shape is fixed to an upper end of the case body 11. An upper face of the cover 14 is covered by a cover sheet 15. Further, a frame 16 formed in a substantially quadrangular frame shape is fixed to a lower end side of the cover 14. The case body 11 is disposed so as to cover the movable module 3 and the shake correction mechanism 7 from an outer peripheral side. The lower case body 12 is formed in a substantially rectangular tube shape with a bottom. A through-hole 12a is formed in a bottom part of the lower case body 12. The through-hole 12a is closed by a bottom plate 17 which is fixed to an under face of the lower case body 12. A stopper 18 for restricting a swing range of the movable module 3 is fixed between a lower end of the case body 11 and an upper end of the lower case body 12.

A spring member 5 is a plate spring which is formed in a flat plate shape. The spring member 5 is provided with a movable side fixed part which is fixed to an upper end side of the movable module 3, a support side fixed part which is fixed to an upper end side of the support body 4, and a plurality of arm parts which connect the movable side fixed part with the support side fixed part. The spring member 5 functions to maintain posture of the movable module 3 when an electric current is not supplied to shake correction coils 26 described below structuring the shake correction mechanism 7.

The spring member 6 is a plate spring which is formed in a plate shape as a whole and is formed in a substantially square frame shape. The spring member 6 is disposed so that its four sides are substantially parallel to the front and rear direction or the right and left direction. A center part of each of sides of the spring member 6 which is formed in a substantially square frame shape is formed with a meandering part which meanders with respect to the front and rear direction or the right and left direction. Further, the spring member 6 is structured of two spring members 31 and 32 which are laminated so as to be abutted with each other. The spring member 31 and the spring member 32 are joined to each other by laser welding.

A spherical body 20 formed in a spherical shape is fixed to each of inner sides of four corners of the spring member 6. The spherical body 20 is formed of metal material. The spherical body 20 is joined to the spring member 6 by laser welding. Among four spherical bodies 20, two spherical bodies 20 which are disposed on one diagonal line of the spring member 6 are supported by support members 22 which turnably support the spherical bodies 20, and two remaining spherical bodies 20 are supported by support members 23 which turnably support the spherical bodies 20. The support members 22 are fixed to an upper end side of the holder 9. The support members 23 are fixed to a lower end side of the frame 16. The support members 22 and 23 are formed with a recessed part in a hemispherical shape in which a part of the spherical body 20 is disposed. The support members 22 and 23 turnably hold the spherical bodies 20 from an inner peripheral side with respect to the spring member 6.

The shake correction mechanism 7 includes shake correction coils 26 as coils, which are respectively fixed to four side faces of the holder 9, and shake correction magnets 27 as drive magnets which are respectively fixed to four inner side faces of the case body 11. In other words, the shake correction mechanism 7 includes four shake correction coils 26 and four shake correction magnets 27. The shake correction coil 26 is formed by winding a conducting wire in a substantially rectangular frame shape. The shake correction magnet 27 is formed in a rectangular flat plate shape and is fixed to an inner side face of the case body 11 so as to face the shake correction coil 26. In this embodiment, a coil unit 35 (see FIG. 4) is structured of the holder 9 and four shake correction coils 26. A detailed structure of the coil unit 35 will be described below. The shake correction mechanism 7 in this embodiment is a drive mechanism.

In the photographing optical device 1 structured as described above, when a variation of inclination of the movable module 3 is detected by a gyroscope 28 (see FIG. 2) which is attached to a lower end face of the movable module 3, an electric current is supplied to the shake correction coils 26 based on a detected result by the gyroscope 28. Further, when an electric current is supplied to the shake correction coils 26, the spherical body 20 is turned with the support member 23 as a center and the support member 22 is turned with the spherical body 20 as a turning center and the spring parts of the spring member 6 are resiliently bent. As a result, the movable module 3 is swung so as to incline the optical axis "L" to correct the shake.

(Structure of Coil Unit)

Figure 5:
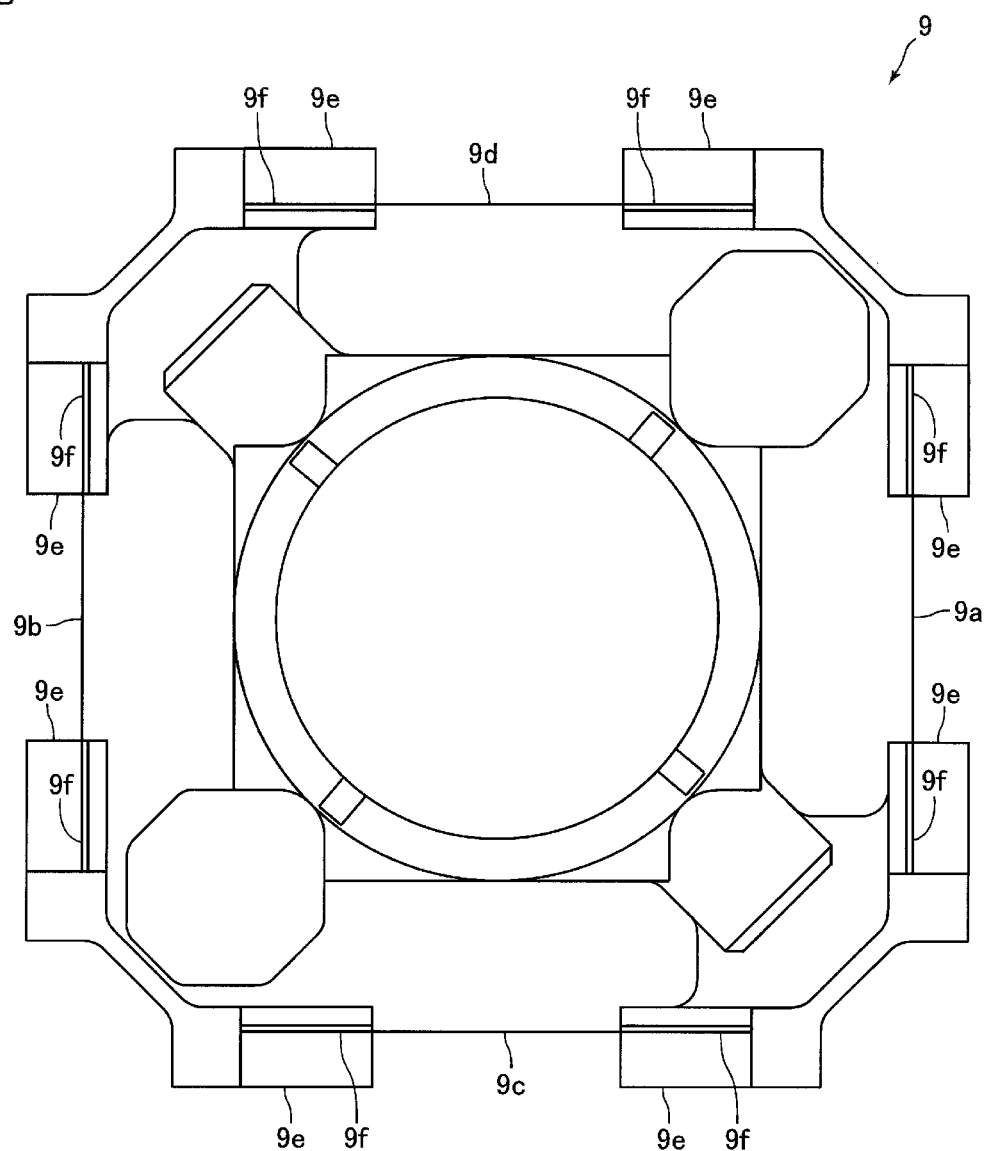
FIG. 5 is a plan view showing a holder in FIG. 4.

FIG. 4 is a perspective view showing a coil unit 35 in accordance with an embodiment of the present invention. FIG. 5 is a plan view showing the holder 9 in FIG. 4.

As described above, the coil unit 35 is structured of the holder 9 and four shake correction coils 26. Further, as described above, the holder 9 is formed in a tube shape whose outward shape when viewed in the optical axis direction is a substantially square shape. In other words, an outer peripheral face of the holder 9 when viewed in the axial direction of the holder 9 is formed in a substantially square shape and the outer peripheral face of the holder 9 is formed with four side faces 9a through 9d in a flat face shape as shown in FIG. 5. The side face 9a and the side face 9b are substantially parallel to each other and the side face 9c and the side face 9d are substantially parallel to each other. In other words, the outer peripheral face of the holder 9 is formed with a side face pair comprised of a pair of the side faces 9a and 9b substantially parallel to each other and a side face pair comprised of a pair of the side faces 9c and 9d substantially parallel to each other. The outer peripheral face of the holder 9 is formed of the two side face pairs. In the photographing optical device 1, the side faces 9a and 9b are perpendicular to the right and left direction and the side faces 9c and 9d are perpendicular to the front and rear direction.

Each of the side faces 9a through 9d is formed with two protruded parts 9e which protrude to an outer peripheral side of the holder 9. Two protruded parts 9e formed on each of the side faces 9a and 9b are formed with a predetermined space therebetween in the front and rear direction and two protruded parts 9e formed on each of the side faces 9c and 9d are formed with a predetermined space therebetween in the right and left direction. One shake correction coil 26 is directly wound around two protruded parts 9e. Therefore, two protruded parts 9e may be considered that one protruded part 9e is divided into two portions in a longitudinal direction of the shake correction coil 26.

The shake correction coil 26 is, as described above, formed in a substantially rectangular frame shape and, as shown in FIG. 4, the shake correction coil 26 is structured of two long side parts 26a and two short side parts 26b which are shorter than the long side parts 26a. The shake correction coil 26 is wound around the protruded parts 9e so that its short widthwise direction is coincided with the optical axis direction. Further, the shake correction coils 26 wound around the protruded parts 9e of the side faces 9a and 9b are wound around the protruded parts 9e so that their longitudinal directions are coincided with the front and rear direction, and the shake correction coils 26 wound around the protruded parts 9e of the side faces 9c and 9d are wound around the protruded parts 9e so that their longitudinal directions are coincided with the right and left direction. In other words, the shake correction coils 26 are wound around the protruded parts 9e so that their longitudinal directions are coincided with the front and rear direction or the right and left direction which are perpendicular to the optical axis direction.

As shown in FIGS. 3 and 4, when a portion of the long side part 26a of an inner face of the shake correction coil 26 formed in a substantially rectangular frame shape is referred to as a first inner face 26c and a portion of the short side part 26b of the inner face of the shake correction coil 26 is referred to as a second inner face 26d, the protruded part 9e is formed so as to contact with parts of two first inner faces 26c of the shake correction coil 26 and at least a part of two second inner faces 26d. Specifically, the protruded part 9e is formed so that parts of two first inner faces 26c are contacted with each of the two protruded parts 9e formed on the side faces 9a through 9d (in other words, parts of two first inner faces 26c are contacted with one protruded part 9e), and that at least a part of two second inner faces 26d is contacted with each of two protruded parts 9e. Further, the inner face of the shake correction coil 26 is directly contacted with the protruded part 9e.

The long side part 26a disposed on a lower side of two long side parts 26a is contacted with one of the side faces 9a through 9d. In other words, in the shake correction coils 26 wound around the protruded parts 9e of the side faces 9a and 9b, inner side faces in the right and left direction of the long side parts 26a disposed on a lower side of two long side parts 26a are contacted with the side faces 9a and 9b. Further, in the shake correction coils 26 wound around the protruded parts 9e of the side faces 9c and 9d, inner side faces in the front and rear direction of the long side parts 26a disposed on a lower side of two long side parts 26a are contacted with the side faces 9c and 9d.

Further, the holder 9 is formed with a contact face 9f with which the long side part 26a disposed on an upper side of two long side parts 26a is contacted. The contact face 9f is formed so as to be connected with an upper end of the protruded part 9e (see FIGS. 2 and 7). Further, as shown in FIG. 5, the contact face 9f is formed on the same plane as each of the side faces 9a through 9d. In the shake correction coils 26 wound around the protruded parts 9e of the side faces 9a and 9b, an inner side face in the right and left direction of the long side part 26a disposed on an upper side of two long side parts 26a is contacted with the contact faces 9f which are connected with the upper ends of the protruded parts 9e of the side faces 9a and 9b. Further, in the shake correction coils 26 wound around the protruded parts 9e of the side faces 9c and 9d, an inner side face in the front and rear direction of the long side part 26a disposed on an upper side of two long side parts 26a is contacted with the contact faces 9f which are connected with the upper ends of the protruded parts 9e of the side faces 9c and 9d.

Further, a thickness of the protruded part 9e (protruding amount of the protruded part 9e from the side faces 9a through 9d) is thicker than a thickness of the shake correction coil 26 and a tip end side of the protruded part 9e is protruded to an outer peripheral side relative to the shake correction coil 26. In other words, a thickness in the right and left direction of the protruded part 9e formed on the side faces 9a and 9b is set to be thicker than a thickness of the shake correction coil 26 and thus an outside end portion in the right and left direction of the protruded part 9e formed on the side faces 9a and 9b is protruded to an outer side in the right and left direction relative to the shake correction coil 26. Further, a thickness in the front and rear direction of the protruded part 9e formed on the side faces 9c and 9d is set to be thicker than a thickness of the shake correction coil 26 and thus an outside end portion in the front and rear direction of the protruded part 9e formed on the side faces 9c and 9d is protruded to an outer side in the front and rear direction relative to the shake correction coil 26.

Two shake correction coils 26 wound around a side-face pair of the protruded parts 9e comprised of a pair of the side faces 9a and 9b are structured of one conducting wire, and two shake correction coils 26 wound around a side-face pair of the protruded parts 9e comprised of a pair of the side faces 9c and 9d are structured of one conducting wire. In other words, the two shake correction coils 26 wound around the protruded parts 9e of the side faces 9a and 9b are structured of one continuous conducting wire and the two shake correction coils 26 wound around the protruded parts 9e of the side faces 9c and 9d are structured of one continuous conducting wire.

(Structure of Winding Device)

Figure 6:
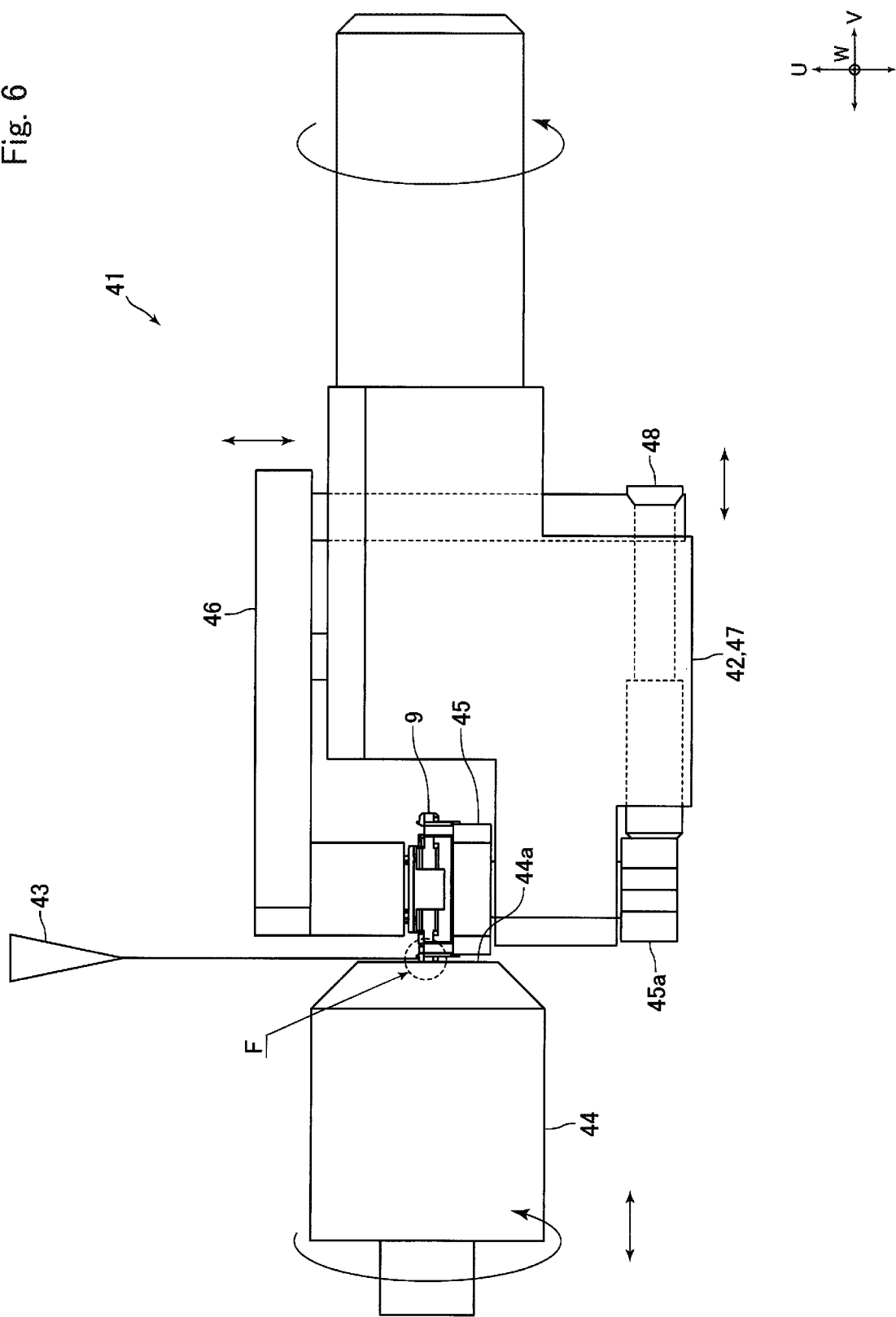
FIG. 6 is a side view showing a part of a winding device in accordance with an embodiment of the present invention.
Figure 7:
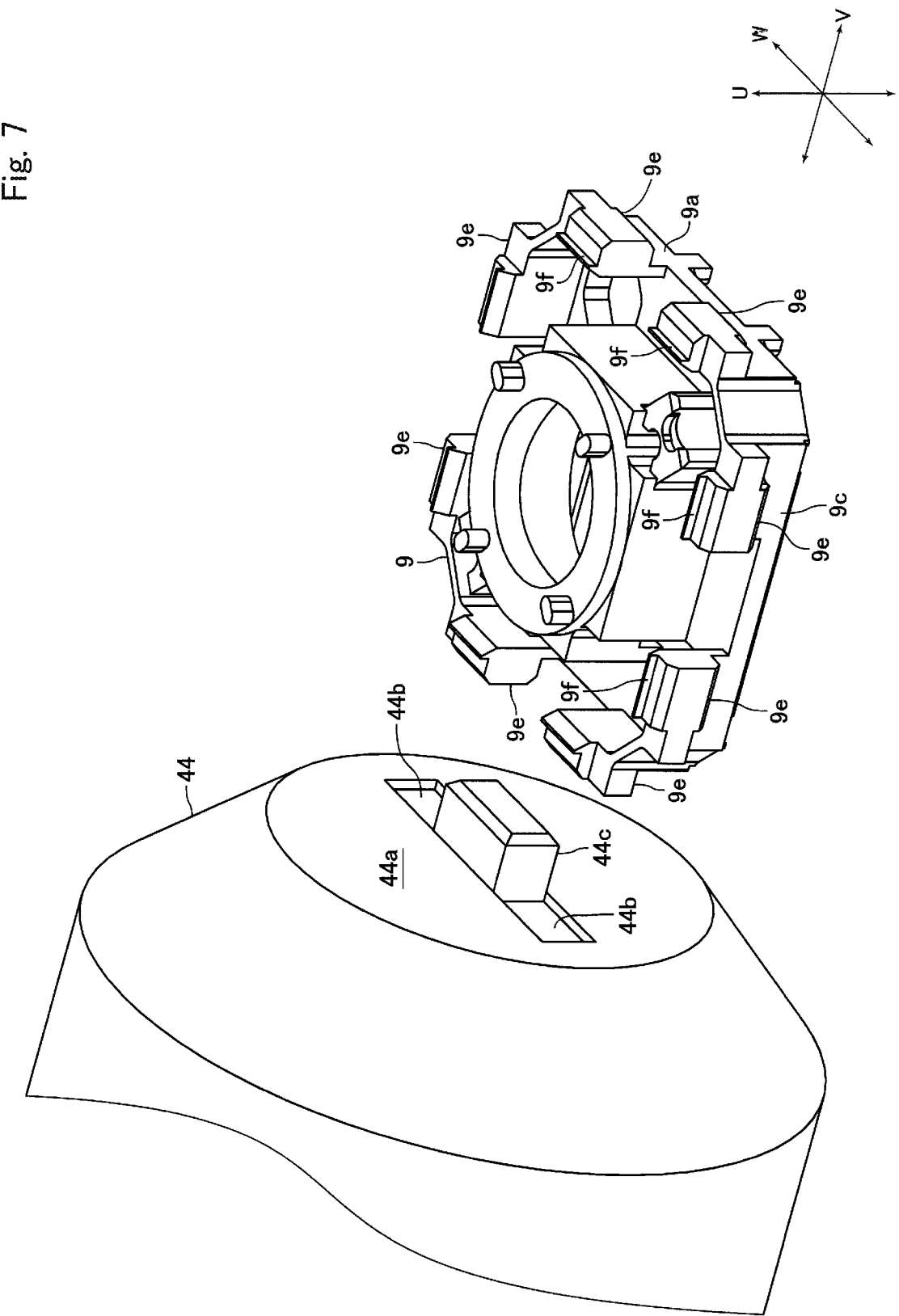
FIG. 7 is a perspective view showing a part of a subordinate head and a holder shown in FIG. 6.
Figure 9:
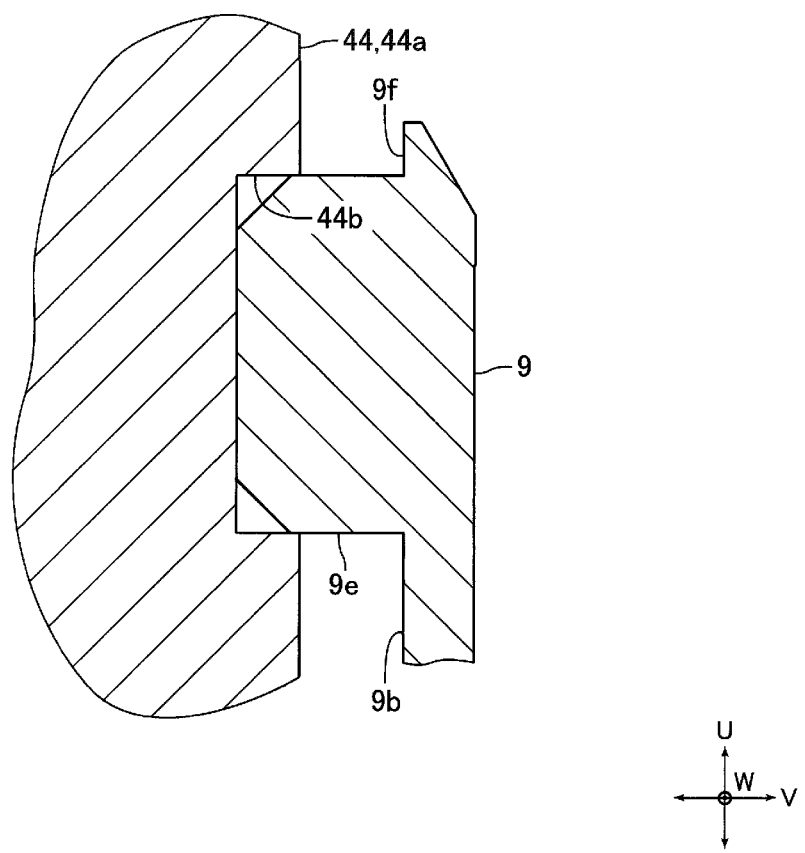
FIG. 9 is an enlarged cross-sectional view showing the "F" part in FIG. 6.

FIG. 6 is a side view showing a part of a winding device 41 in accordance with an embodiment of the present invention. FIG. 7 is a perspective view showing a part of a subordinate head 44 and the holder 9 shown in FIG. 6. FIG. 8 is a perspective view showing a part of a holder mounting part 45 and a lock part 48 shown in FIG. 6. FIG. 9 is an enlarged cross-sectional view showing the "F" part in FIG. 6.

Winding of the shake correction coil 26 around the protruded part 9e of the holder 9 which is a coil holding member is performed by using a winding device 41. In other words, in this embodiment, the shake correction coil 26 is directly wound around the protruded part 9e by using the winding device 41. Specifically, the shake correction coil 26 is successively wound around the protruded parts 9e of four side faces 9a through 9d by using the winding device 41. As shown in FIG. 6, the winding device 41 includes a main body part 42 to which the holder 9 is fixed, a rotation mechanism (not shown) structured to rotate the main body part 42, a supply nozzle 43 for supplying a conducting wire structuring the shake correction coil 26, and a subordinate head 44 which is rotated together with the main body part 42 and functions as a guide when a conducting wire is to be wound around the protruded part 9e.

The main body part 42 includes a holder mounting part 45 on which the holder 9 is mounted, a clamp part 46 which sandwiches the holder 9 together with the holder mounting part 45 to fix the holder 9, and a base part 47 which turnably holds the holder mounting part 45 and movably holds the clamp part 46. Further, the main body part 42 includes a lock part 48 structured to fix the holder mounting part 45 and the clamp part 46 to the base part 47. In the following descriptions, an axial direction of the holder 9 mounted on the holder mounting part 45 is referred to as a "U" direction and an axial direction of rotation of the main body part 42 rotated by the rotation mechanism is referred to as a "V" direction. The "U" direction and the "V" direction are perpendicular to each other. Further, a direction perpendicular to the "U" direction and the "V" direction is referred to as a "W" direction.

The holder mounting part 45 is formed in a shaft shape as a whole whose longitudinal direction is the "U" direction and is turnably held by the base part 47 with the "U" direction as an axial direction of turning. In other words, the axial direction of rotation of the main body part 42 and an axial direction of turning of the holder mounting part 45 are perpendicular to each other. The holder 9 is mounted on one end of the holder mounting part 45 and a turning restriction part 45a formed in a cross shape is formed at the other end of the holder mounting part 45 (see FIG. 8). The turning restriction part 45a restricts a turning position of the four side faces 9a through 9d and the side face among four side faces 9a through 9d where a conducting wire is to be wound around the protruded part 9e is positioned by the lock part 48 so that the side face is parallel to an opposed face 44a of a subordinate head 44 described below. The clamp part 46 is linearly movable in the "U" direction with respect to the base member 47. In other words, a moving direction of the clamp part 46 is coincided with an axial direction of turning of the holder mounting part 45 and is perpendicular to the axial direction of rotation of the main body part 42. The lock part 48 is formed in a shaft shape whose longitudinal direction is the "V" direction and is linearly movable in the "V" direction with respect to the base part 47.

In this embodiment, in a state that the holder 9 is sandwiched between one end of the holder mounting part 45 and the clamp part 46, a tip end of the lock part 48 is engaged with the turning restriction part 45a and the lock part 48 is engaged with the clamp part 46. As a result, the holder mounting part 45 and the clamp part 46 are fixed and the holder 9 is fixed to the main body part 42. In a state that the holder 9 is fixed to the main body part 42, one of the side faces 9a and 9b and the side faces 9c and 9d of the holder 9 is parallel to a "W-U" plane structured of the "W" direction and the "U" direction and the other of the side faces 9a and 9b and the side faces 9c and 9d is parallel to a "U-V" plane structured of the "U" direction and the "V" direction. Further, when the lock part 48 is moved in the "V" direction from a state that the holder 9 is fixed to the main body part 42, the holder mounting part 45 is capable of being turned and the clamp part 46 is capable of being moved.

The subordinate head 44 is linearly movable in the "V" direction which is the axial direction of rotation of the main body part 42. The subordinate head 44 can be moved to a close position, which is close to the side face through the protruded part 9e among the side faces 9a through 9d of the holder 9 where a conducting wire is to be wound around, and to a separated position separated from the protruded part 9e. Further, the subordinate head 44 is rotatable with the "V" direction which is the axial direction of rotation of the main body part 42 as an axis of rotation. A rotation mechanism structured to rotate the subordinate head 44 is connected with the subordinate head 44. The subordinate head 44 is rotated by the rotation mechanism so that the main body part 42 and the subordinate head 44 are synchronously rotated. When viewed in the "V" direction, a rotation center of the main body part 42 and a rotation center of the subordinate head 44 are coincided with each other. Further, the position in the "U" direction and the "W" direction of the holder mounting part 45 is set so that the rotation center of the main body part 42 and the rotation center of the subordinate head 44 are coincided with a center position of the shake correction coil 26 when a conducting wire which is supplied from the supply nozzle 43 is wound around the protruded part 9e to form the shake correction coil 26. Further, the subordinate head 44 is disposed so as to face one of the side faces 9a through 9d of the holder 9 in the "V" direction. Specifically, the subordinate head 44 is disposed so as to face one of the side faces 9a through 9d where the protruded parts 9e around which a conducting wire supplied from a supply nozzle 43 is to be wound are formed.

An opposed face 44a of the subordinate head 44 to one of the side faces 9a through 9d is parallel to the one of the side faces 9a through 9d where a conducting wire is to be wound around and, as shown in FIGS. 7 and 9, the opposed face 44a is formed with two recessed parts 44b into which the tip end side portions of the protruded parts 9e (outer side end portions in the "V" direction) are entered. Further, the opposed face 44a functions as a guide for winding when a conducting wire supplied from the supply nozzle 43 is to be wound around the protruded part 9e and functions also as a restriction face for forming an outer side face of the shake correction coil 26 at a time of winding of the conducting wire. The opposed face 44a is formed with a head side protruded part 44c which is protruded to the holder 9 side so as to be disposed between two protruded parts 9e formed on the side faces 9a through 9d. When the subordinate head 44 is moved to the holder 9 side and the opposed face 44a and the side face where a conducting wire is to be wound around are set in a close state, two protruded parts 9e are sandwiched between the opposed face 44a and the side face and, in addition, the head side protruded part 44c is entered between two protruded parts 9e and thereby the holder 9 can be positioned. Further, the protruded parts 9e and the head side protruded part 44c prevent that a conducting wire supplied from the supply nozzle 43 is entered between the tip ends of the protruded parts 9e and the opposed face 44a to occur winding collapse. The two recessed parts 44b are formed with a space therebetween having a distance which is the same as that of the space between the two protruded parts 9e in the "W" direction. The head side protruded part 44c is formed between the two recessed parts 44b in the "W" direction.

When the shake correction coil 26 is to be wound around the protruded parts 9e by using the winding device 41, first, the holder 9 is fixed to the holder mounting part 45 of the main body part 42 and one end of a conducting wire is bound and fixed at a predetermined position of the holder 9. After that, the subordinate head 44 is moved in the "V" direction so that the tip end side portions of the protruded parts 9e are disposed in the recessed parts 44b of the subordinate head 44 (specifically, so that the tip end face of the protruded part 9e is contacted with a bottom face of the recessed part 44b as shown in FIG. 9) and is set at a close position to the side face where the conducting wire is to be wound. In this state, while supplying a conducting wire from the supply nozzle 43, the main body part 42 and the subordinate head 44 are rotated together and the holder 9 fixed to the holder mounting part 45 is also rotated around the axial direction of rotation of the main body part 42 and thereby a conducting wire supplied from the supply nozzle 43 is wound around the two protruded parts 9e to structure one shake correction coil 26. After that, the subordinate head 44 is temporarily separated from the holder 9 and the holder mounting part 45 is turned so that the side face of the holder 9 facing the opposed face 44a of the subordinate head 44 is changed and, in this manner, the shake correction coil 26 is successively wound around the protruded parts 9e of four side faces 9a through 9d.

In this embodiment, for example, the holder mounting part 45 is turned so that the shake correction coil 26 is wound around the protruded parts 9e of the side face 9a, the protruded parts 9e of the side face 9b, the protruded parts 9e of the side face 9c, and the protruded parts 9e of the side face 9d in this order. Alternatively, for example, the holder mounting part 45 is turned so that the shake correction coil 26 is wound around the protruded parts 9e of the side face 9d, the protruded parts 9e of the side face 9c, the protruded parts 9e of the side face 9b, and the protruded parts 9e of the side face 9a in this order. When winding of the shake correction coil 26 around the protruded parts 9e of four side faces 9a through 9d is finished, the conducting wire supplied from the supply nozzle 43 is cut off and a predetermined processing is performed on the cut end of the conducting wire. Further, when winding of the shake correction coil 26 around the protruded parts 9e of four side faces 9a through 9d is finished, the conducting wire is cut off between the protruded part 9e of the side face 9b and the protruded part 9e of the side face 9c.

Further, each time winding of the shake correction coil 26 around the protruded parts 9e of each of the side faces 9a through 9d is finished, the subordinate head 44 is moved in the "V" direction and separated from the holder 9 so that the holder mounting part 45 to which the holder 9 is fixed is capable of being turned. Further, the conducting wire in this embodiment is a fusion wire having a fusion film and, each time winding of the shake correction coil 26 around the protruded parts 9e of each of the side faces 9a through 9d is finished, the shake correction coil 26 is heated and the conducting wires are fused to each other.

In accordance with an embodiment of the present invention, it may be structured that, when winding of the shake correction coil 26 around one of the protruded parts 9e of the side faces 9a and 9b and the protruded parts 9e of the side faces 9c and 9d is finished, the conducting wire is cut off and then, after one end of the conducting wire is bound to the holder 9 again, the shake correction coil 26 is wound around the other of the protruded parts 9e of the side faces 9a and 9b and the protruded parts 9e of the side faces 9c and 9d. Further, after winding of the shake correction coil 26 around the protruded parts 9e of four side faces 9a through 9d is finished, if necessary, the shake correction coil 26 may be additionally heated so that the conducting wire is surely fusion-bonded, or an adhesive may be applied to increase a fixed strength of the shake correction coil 26 to the holder 9.

(Principal Effects in this Embodiment)

As described above, in this embodiment, the shake correction coil 26 is directly wound around the two protruded parts 9e formed on each of the side faces 9a through 9d of the holder 9. Therefore, according to this embodiment, the shake correction coil 26 can be attached to the holder 9 as it is by winding the shake correction coil 26 around the protruded parts 9e. Further, in this embodiment, two shake correction coils 26 wound on the side faces 9a and 9b are structured of one continuous conducting wire and two shake correction coils 26 wound on the side faces 9c and 9d are structured of one continuous conducting wire. Therefore, according to this embodiment, although four shake correction coils 26 are attached to the holder 9, processing of eight end parts of the conducting wire is not required and only processing of four end parts of the conducting wire is required. Therefore, in this embodiment, attaching work of the shake correction coil 26 to the holder 9 can be performed easily.

In this embodiment, the tip end side of the protruded part 9e is protruded to an outer peripheral side relative to the shake correction coil 26. Therefore, according to this embodiment, winding collapse of the shake correction coil 26 wound around the protruded parts 9e is hard to be occurred. Further, in this embodiment, the tip end side of the protruded part 9e is protruded to an outer peripheral side relative to the shake correction coil 26 and thus, at a time of assembling or the like of the photographing optical device 1, the shake correction coil 26 is hard to be contacted with an external member when the coil unit 35 is handled. Therefore, according to this embodiment, damage of the shake correction coil 26 can be prevented when the coil unit 35 is handled. Further, in this embodiment, an inner face of the shake correction coil 26 is directly contacted with the protruded parts 9e and thus a fixed strength of the shake correction coil 26 to the holder 9 can be increased.

In this embodiment, the protruded parts 9e are formed so that parts of two first inner faces 26c are contacted with each of two protruded parts 9e formed on the side faces 9a through 9d, and at least a part of two second inner faces 26d is contacted with each of two protruded parts 9e. Therefore, according to this embodiment, the shake correction coil 26 which is directly wound around the two protruded parts 9e and is formed in a substantially rectangular frame shape can be formed with a high degree of accuracy. Further, according to this embodiment, accuracy of an attaching position of the shake correction coil 26 to the holder 9 can be enhanced.

In this embodiment, the winding device 41 includes the main body part 42 to which the holder 9 is fixed, and the subordinate head 44 which is disposed so as to face one of the side faces 9a through 9d of the holder 9 and is rotated together with the main body part 42. Therefore, according to this embodiment, even when the shake correction coil 26 is directly wound around the protruded parts 9e of the holder 9 having no winding collapse prevention part such as a flange part for preventing winding collapse of the shake correction coil 26 to an outer peripheral side of the holder 9, winding collapse of the shake correction coil 26 can be prevented by the subordinate head 44.

Especially, in this embodiment, the subordinate head 44 is formed with the recessed parts 44b into which the tip end side portions of the protruded parts 9e are entered. Therefore, even when variations in manufacture of structural components of the winding device 41 and the holder 9 are occurred, or even when there are assembling errors of the winding device 41 and attaching errors of the holder 9 to the main body part 42, gap spaces are not formed between the tip end faces of the protruded parts 9e and the opposed face 44a of the subordinate head 44. Therefore, according to this embodiment, winding collapse of the shake correction coil 26 which is directly wound around the protruded parts 9e having no winding collapse prevention part can be prevented surely.

In this embodiment, the subordinate head 44 is formed with the head side protruded part 44c which is to be disposed between two protruded parts 9e formed on the side faces 9a through 9d. Therefore, according to this embodiment, when the shake correction coil 26 is to be wound around the protruded parts 9e, positioning of the holder 9 with respect to the subordinate head 44 is easily performed.

(Modified Embodiment of Holder and Subordinate Head)

Figure 10A:
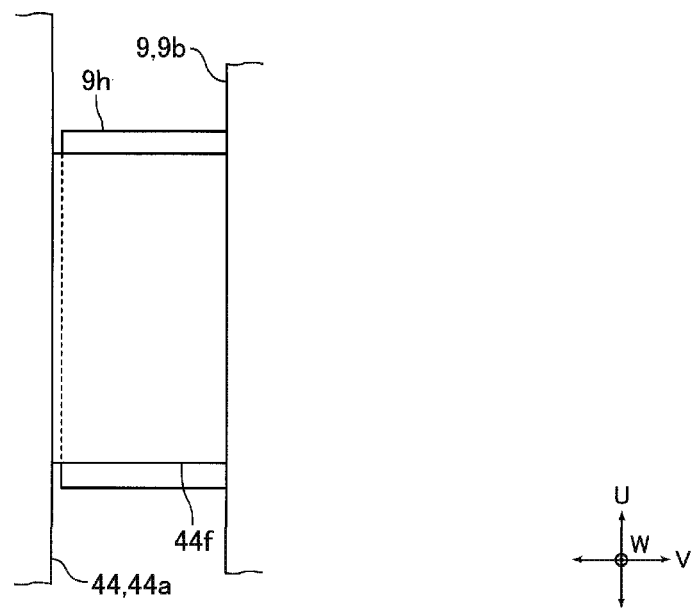
FIGS. 10(A) and 10(B) are enlarged views for explaining a structure of a holder and a subordinate head in accordance with another embodiment of the present invention.
Figure 10B:
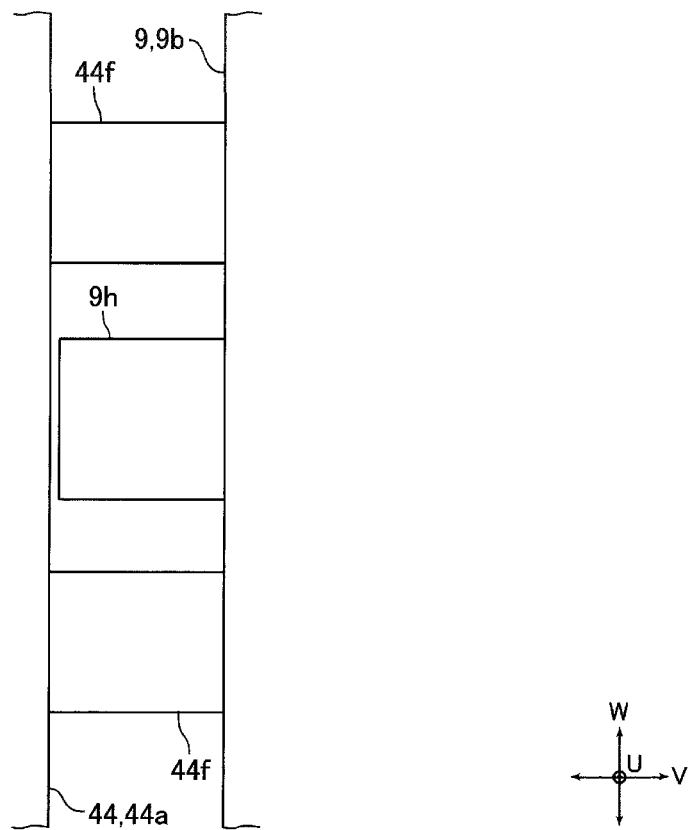

FIGS. 10(A) and 10(B) are enlarged views for explaining a structure of a holder 9 and a subordinate head 44 in accordance with another embodiment of the present invention. FIG. 10(A) is its side view and FIG. 10(B) is its plan view.

In the embodiment described above, two protruded parts 9e are formed on each of the side faces 9a through 9d. However, the present invention is not limited to this embodiment. For example, three or more protruded parts around which the shake correction coil 26 is wound may be formed on each of the side faces 9a through 9d. Further, one protruded part around which the shake correction coil 26 is wound may be formed on each of the side faces 9a through 9d. In a case that one protruded part is formed on each of the side faces 9a through 9d, for example, the one protruded part may be formed so that at least a part of two first inner faces 26c and at least a part of two second inner faces 26d are contacted with the protruded part.

Further, in a case that one protruded part around which the shake correction coil 26 is wound is formed on each of the side faces 9a through 9d, one protruded part 9h (see FIGS. 10(A) and 10(B)) which is contacted with only center portions of two first inner faces 26c may be formed. In this case, as shown in FIG. 10(B), the subordinate head 44 is formed with two head side protruded parts 44f which are protruded to the holder 9 side and disposed on both sides in the "W" direction with respect to the one protruded part 9h. Further, in this case, as shown in FIG. 10(A), a width of the protruded part 9h in the "U" direction is set to be wider than a width of the head side protruded part 44f in the "U" direction. Further, in this case, as shown in FIG. 10(B), a thickness of the protruded part 9h in the "V" direction which is a thickness direction of the shake correction coil 26 is set to be not more than a thickness of the head side protruded part 44f in the "V" direction. Specifically, a thickness of the protruded part 9h in the "V" direction is set to be thinner than a thickness of the head side protruded part 44f in the "V" direction.

In the modified embodiment shown in FIGS. 10(A) and 10(B), the width of the protruded part 9h in the "U" direction is wider than the width of the head side protruded part 44f in the "U" direction. Therefore, after a conducting wire is wound around the protruded part 9h and the head side protruded parts 44f, the subordinate head 44 is retreated from the holder 9 in a separated direction and, as a result, the shake correction coil 26 is directly wound around the protruded part 9h. In other words, in the modified embodiment shown in FIGS. 10(A) and 10(B), even in a case that one protruded part 9h with which only center portions of two first inner faces 26c are contacted is formed on the side faces 9a through 9d of the holder 9, the shake correction coil 26 can be directly wound around the protruded part 9h. In the coil unit 35 structured as described above, two head side protruded parts 44f provided in the subordinate head 44 are used between the one protruded part 9h and the two short side parts 26b of the shake correction coil 26 to determine positions of the second inner faces 26d of two short side parts 26b when a conducting wire is to be wound around the protruded part 9h. Therefore, spaces into which two head side protruded parts 44f have been entered are left between the second inner faces 26d of two short side parts 26b and the protruded part 9h and formed on both sides with respect to the one protruded part 9h.

Further, in the modified embodiment shown in FIGS. 10(A) and 10(B), the thickness of the protruded part 9h in the "V" direction is not more than the thickness of the head side protruded part 44f in the "V" direction. Therefore, even when variations in manufacture of structural components of the winding device 41 and the holder 9 are occurred, or even when there are assembling errors of the winding device 41 and attaching errors of the holder 9 to the main body part 42, a gap space is prevented from being formed between the tip end face of the head side protruded part 44f and the side faces 9a through 9d. Accordingly, even in a case that one protruded part 9h with which only center portions of two first inner faces 26c are contacted is formed on the side faces 9a through 9d of the holder 9, winding collapse of the shake correction coil 26 which is directly wound around the protruded part 9h can be prevented surely.

In addition, in the modified embodiment shown in FIGS. 10(A) and 10(B), in a case that a distance between the side faces 9a through 9d of the holder 9 and the opposed face 44a of the subordinate head 44 is set to be similar to the embodiment described above and that the shake correction coil 26 having the thickness same as the thickness of the shake correction coil 26 in the embodiment described above is wound around the protruded part 9h, the tip end side of the protruded part 9h is not protruded to an outer peripheral side relative to the shake correction coil 26. Therefore, in the modified embodiment shown in FIGS. 10(A) and 10(B), while a drive force of the shake correction mechanism 7 is secured by securing the thickness of the shake correction coil 26, the size of the coil unit 35 can be reduced in the front and rear direction and the right and left direction. Accordingly, while a drive force of the shake correction mechanism 7 is secured, the size of the movable module 3 can be reduced in the front and rear direction and the right and left direction and, as a result, the size of the photographing optical device 1 can be reduced in the front and rear direction and the right and left direction.

Other Embodiments

Although the present invention has been shown and described with reference to a specific embodiment, various changes and modifications will be apparent to those skilled in the art from the teachings herein.

In the embodiment described above, the head side protruded part 44c is formed in the subordinate head 44. However, no head side protruded part 44c may be formed in the subordinate head 44. Further, in the embodiment described above, the recessed part 44b is formed in the subordinate head 44. However, no recessed part 44b may be formed in the subordinate head 44. In this case, in the coil unit 35, an outer side end face in the right and left direction (in other words, tip end face) of the protruded part 9e which is formed on the side faces 9a and 9b is substantially coincided with an outer side face in the right and left direction of the shake correction coil 26, and an outer side end face in the front and rear direction of the protruded part 9e formed on the side faces 9c and 9d is substantially coincided with an outer side face in the front and rear direction of the shake correction coil 26.

Further, in the modified embodiment shown in FIGS. 10(A) and 10(B), the opposed face 44a of the subordinate head 44 may be formed with a recessed part into which the protruded part 9h is entered. In this case, the thickness of the protruded part 9h in the "V" direction is set to be larger than the thickness of the head side protruded part 44f in the "V" direction and is set so that the tip end face of the head side protruded part 44f and the side faces 9a through 9d of the holder 9 are contacted with each other.

In the embodiment described above, two shake correction coils 26 wound around the protruded parts 9e of the side faces 9a and 9b are structured of one continuous conducting wire, and two shake correction coils 26 wound around the protruded parts 9e of the side faces 9c and 9d are structured of one continuous conducting wire. However, the present invention is not limited to this embodiment. For example, each of four shake correction coils 26 may be structured of one conducting wire. In this case, when the shake correction coil 26 is to be wound around the protruded part 9e by using the winding device 41, the holder mounting part 45 may be turned at 90° each time winding of the shake correction coil 26 around the protruded part 9e of each of the side faces 9a through 9d is finished.

In the embodiment described above, an outer peripheral face of the holder 9 when viewed in the axial direction of the holder 9 is formed in a substantially square shape. However, the present invention is not limited to this embodiment. For example, an outer peripheral face of the holder 9 when viewed in the axial direction of the holder 9 may be formed in a substantially rectangular shape or may be formed in a substantially regular hexagonal shape or a substantially regular octagonal shape. In other words, it is required that an outer peripheral face of the holder 9 is formed of two or more side-face pairs each of which is comprised of a pair of side faces substantially parallel to each other. In this case, an even number of the shake correction coils 26 that is the same number as the side faces of the holder 9 is attached to the holder 9. Further, in the embodiment described above, the coil unit 35 is mounted on the photographing optical device 1. However, the coil unit 35 may be mounted on a device other than the photographing optical device 1. In other words, the coil in the present invention may be a coil other than the shake correction coil 26.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A winding device comprising:
a main body part which is rotatable and to which a coil holding member structured to hold a coil is fixed;
a supply nozzle from which a conducting wire for structuring the coil is supplied; and
a subordinate head which is rotatable together with the main body part;
wherein a side face of the coil holding member is formed with a protruded part which is protruded to an outer peripheral side with respect to the coil holding member and around which the coil is to be directly wound;

wherein the subordinate head is disposed so as to face the side face of the coil holding member; and wherein the subordinate head and the main body part are rotated together in a state that the protruded part is interposed between the subordinate head and the side face of the coil holding member and thereby the conducting wire is wound around the protruded part to structure the coil.

2. The winding device according to claim 1, wherein the subordinate head is formed with a recessed part into which a tip end side portion of the protruded part is entered.

3. The winding device according to claim 1, wherein
the coil holding member is formed in a tube shape,
the coil is formed in a substantially rectangular frame shape which is structured of two long side parts and two short side parts shorter than the long side part,
the coil is wound around the protruded part so that an axial direction of the coil holding member formed in the tube shape and a short widthwise direction of the coil are coincided with each other and that a direction perpendicular to the axial direction and a longitudinal direction of the coil are coincided with each other,
wherein the coil comprises an inner face;
the inner face of the coil comprises two long inner faces and two short inner faces;
the side face comprises two protruded parts and contacts at least parts of the two long inner faces of the first coil and the two short inner faces of the first coil; the subordinate head is formed with a head side protruded part which is protruded to a coil holding member side and disposed between the two protruded parts.

4. The winding device according to claim 1, wherein
the coil holding member is formed in a tube shape,
the coil is formed in a substantially rectangular frame shape which is structured of two long side parts and two short side parts shorter than the long side part,
the coil is wound around the protruded part so that an axial direction of the coil holding member formed in the tube shape and a short widthwise direction of the coil are coincided with each other and that a direction perpendicular to the axial direction and a longitudinal direction of the coil are coincided with each other,
wherein the coil comprises an inner face;
the inner face of the coil comprises two long inner faces and two short inner faces;
the protruded part contacts center portions of the two long inner faces of the first coil;
the subordinate head is formed with two head side protruded parts which are protruded to a coil holding member side and disposed on both sides of the protruded part in the longitudinal direction of the coil,
a width of the protruded part in the axial direction is set to be wider than a width of the head side protruded part in the axial direction, and
a thickness of the protruded part in a thickness direction of the coil which is perpendicular to the axial direction is set to be not more than a thickness of the head side protruded part in the thickness direction of the coil.

5. The winding device according to claim 1, wherein
an outer peripheral face of the coil holding member comprises a plurality of side-face pairs comprised of a pair of side faces which are substantially parallel to each other,
each the side faces of the plurality of side-face pairs comprises a protruded part,
the subordinate head is formed with an opposed face which faces the side face of the coil holding member on which the conducting wire is to be wound, and the subordinate head is movable so as to be close to and separated from the side face on which the conducting wire is to be wound, the coil holding member is turnably attached to the main body part so that the side face of the coil holding member facing the opposed face of the subordinate head can be changed, and the subordinate head and the main body part are rotated together in a state that the opposed face of the subordinate head is close to the side face on which the conducting wire is to be wound and thereby the conducting wire is wound around the protruded part of the coil holding member to structure the coil.

6. The winding device according to claim 5, wherein
the main body part includes a mounting part on which the coil holding member is mounted and a base part which turnably holds the mounting part,
the mounting part is turnable with a direction perpendicular to an axial direction of rotation of the main body part as an axial direction,
the subordinate head is movable in the axial direction of rotation of the main body part, and
the conducting wire is wound around the protruded part of the coil holding member to structure the coil and, after that, the subordinate head is separated from the coil holding member and the mounted part is turned so that the side face of the coil holding member facing the opposed face of the subordinate head is changed and then, the subordinate head is set to be close to the coil holding member again and the conducting wire is wound around the protruded part of the side face having been changed to structure the coil.

7. The winding device according to claim 5, wherein the subordinate head is formed with a recessed part into which a tip end side portion of the protruded part is entered.

8. A winding method comprising:
providing a winding device comprising:
a main body part which is rotatable and to which a coil holding member structured to hold a coil is fixed;
a supply nozzle from which a conducting wire for structuring the coil is supplied; and
a subordinate head which is rotatable together with the main body part;
wherein a side face of the coil holding member is formed with a protruded part which is protruded to an outer peripheral side with respect to the coil holding member and around which the coil is to be directly wound;
wherein the subordinate head is disposed so as to face the side face of the coil holding member;
setting the subordinate head to be close to the side face of the coil holding member so as to interpose the protruded part between the subordinate head and the side face of the coil holding member; and
rotating the subordinate head and the main body part together and thereby the conducting wire is directly wound around the protruded part to structure the coil.

9. The winding method according to claim 8, wherein
the coil holding member is formed in a tube shape,
two protruded parts are formed for the one coil,
the subordinate head is formed with a head side protruded part which is protruded to a coil holding member side and disposed between the two protruded parts,
the subordinate head and the main body part are rotated together and thereby the conducting wire is wound around the two protruded parts so that;

the coil is formed in a substantially rectangular frame shape which is structured of two long side parts and two short side parts shorter than the long side part, the coil is wound around the protruded parts so that an axial direction of the coil holding member formed in the tube shape and a short widthwise direction of the coil are coincided with each other and that a direction perpendicular to the axial direction and a longitudinal direction of the coil are coincided with each other, and wherein the coil comprises an inner face;

the inner face of the coil comprises two long inner faces and two short inner faces;

the two protruded parts contact at least parts of the two long inner faces of the first coil and the two short inner faces of the first coil.

10. The winding method according to claim 8, wherein the coil holding member is formed in a tube shape, the one protruded part is formed for the one coil, the subordinate head is formed with two head side protruded parts which are protruded to a coil holding member side and disposed on both sides of the one protruded part in a longitudinal direction of the coil, a width of the one protruded part in an axial direction of the coil holding member formed in the tube shape is set to be wider than a width of the head side protruded part in the axial direction, a thickness of the one protruded part in a thickness direction of the coil which is perpendicular to the axial direction is set to be not more than a thickness of the head side protruded part in the thickness direction of the coil, the subordinate head and the main body part are rotated together and thereby the conducting wire is wound around the one protruded part and the two head side protruded parts disposed on both sides of the one protruded part so that:

the coil is formed in a substantially rectangular frame shape which is structured of two long side parts and two short side parts shorter than the long side part, and the coil is wound around the one protruded part so that an axial direction of the coil holding member formed in the tube shape and a short widthwise direction of the coil are coincided with each other and that a direction perpendicular to the axial direction and a longitudinal direction of the coil are coincided with each other, and wherein the coil comprises an inner face;

the inner face of the coil comprises two long inner faces and two short inner faces;

the protruded part contacts center portions of the two long inner faces of the first coil.

11. The winding method according to claim 8, wherein an outer peripheral face of the coil holding member is formed with a plurality of side-face pairs comprised of a pair of side faces which are substantially parallel to each other, the protruded part is formed on each of the side faces of the plurality of the side-face pairs, the subordinate head is formed with an opposed face which faces the side face of the coil holding member on which the conducting wire is to be wound, and the subordinate head is movable so as to be close to and separated from the side face on which the conducting wire is to be wound, the coil holding member is turnably attached to the main body part so that the side face of the coil holding member facing the opposed face of the subordinate head can be changed, and the subordinate head and the main body part are rotated together in a state that the opposed face of the subordinate head is close to the side face on which the conducting wire is to be wound and thereby the conducting wire is wound around the protruded part of the coil holding member to structure the coil.

12. The winding method according to claim 11, wherein the main body part includes a mounting part on which the coil holding member is mounted and a base part which turnably holds the mounting part, the mounting part is turnable with a direction perpendicular to an axial direction of rotation of the main body part as an axial direction, the subordinate head is movable in the axial direction of rotation of the main body part, and the conducting wire is wound around the protruded part of the coil holding member to structure the coil and, after that, the subordinate head is separated from the coil holding member and the mounting part is turned so that the side face of the coil holding member facing the opposed face of the subordinate head is changed and then, the subordinate head is set to be close to the coil holding member again and the conducting wire is wound around the protruded part of the side face having been changed to structure the coil.

13. The winding method according to claim 12, wherein the subordinate head is formed with a recessed part into which a tip end side portion of the protruded part is entered, and the subordinate head and the main body part are rotated together in a state that a tip end side portion of the protruded part is entered into the recessed part of the opposed face and thereby the conducting wire is wound around the protruded part to structure the coil.

* * * * *